May 3, 1927.
L. D. SOUBIER
GLASS FEEDER
Filed Nov. 17, 1923
1,626,706
4 Sheets-Sheet 2
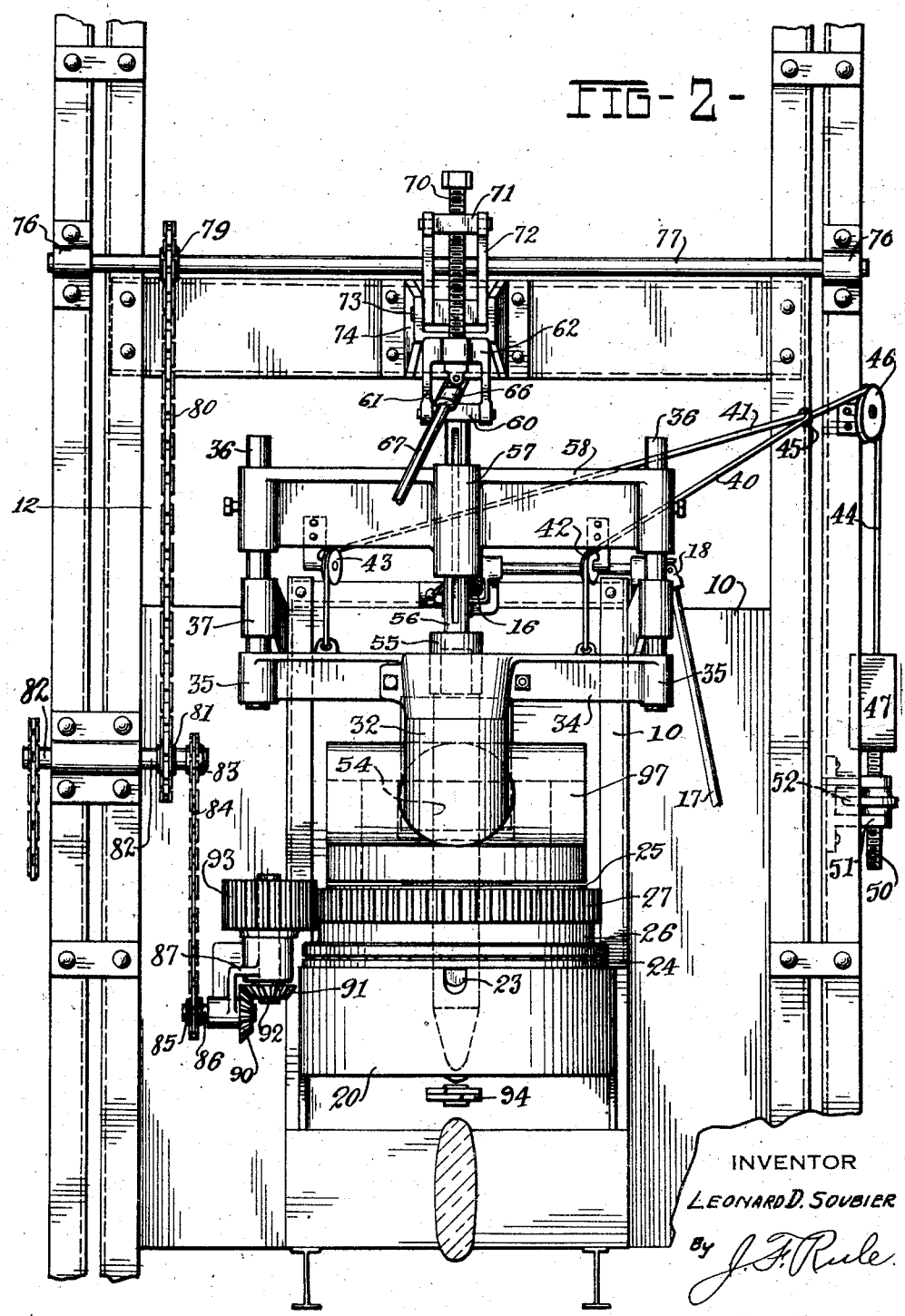
FIG-2-
INVENTOR
LEONARD D. SOUBIER
By J. F. Rule.
His Attorney.

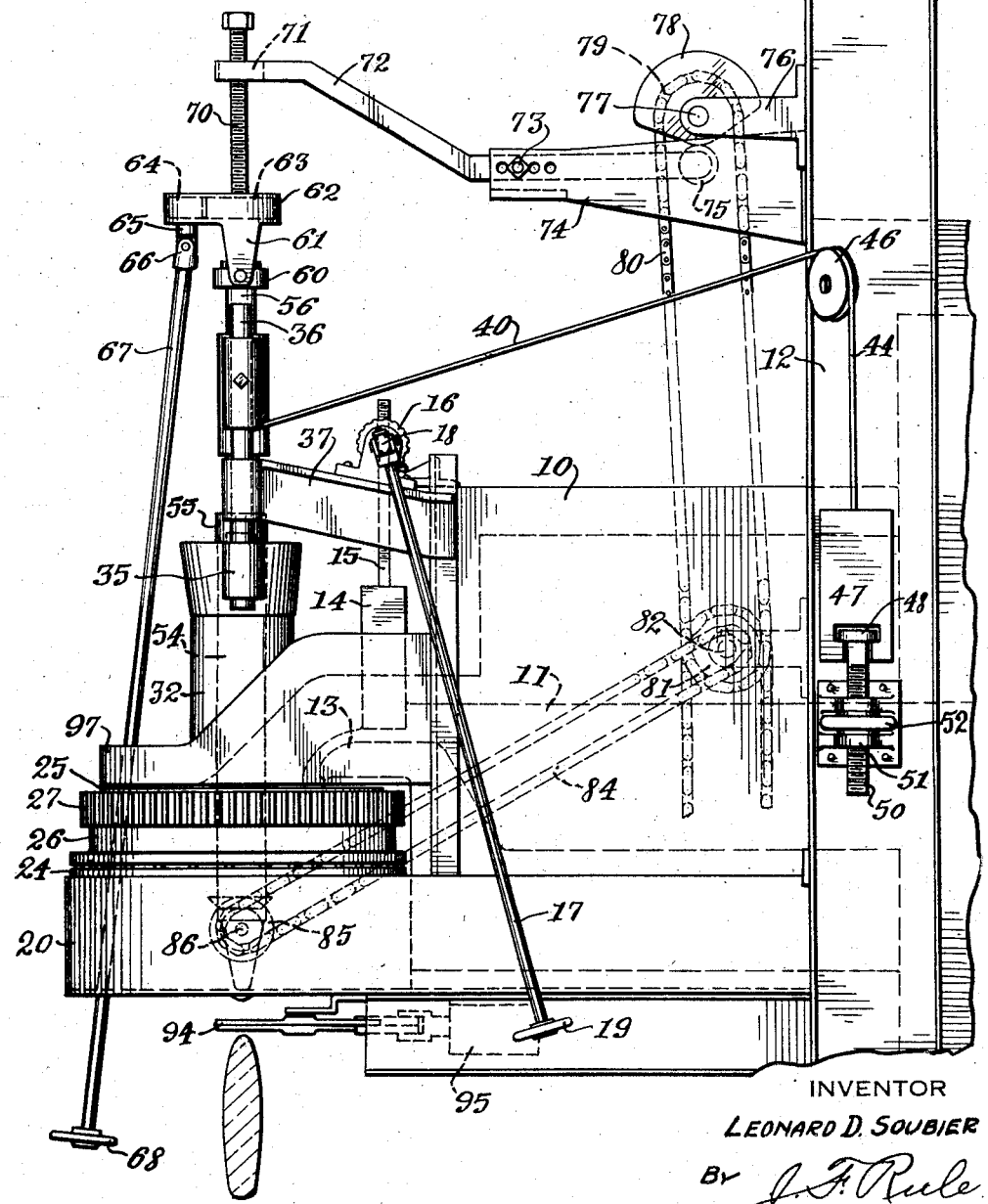

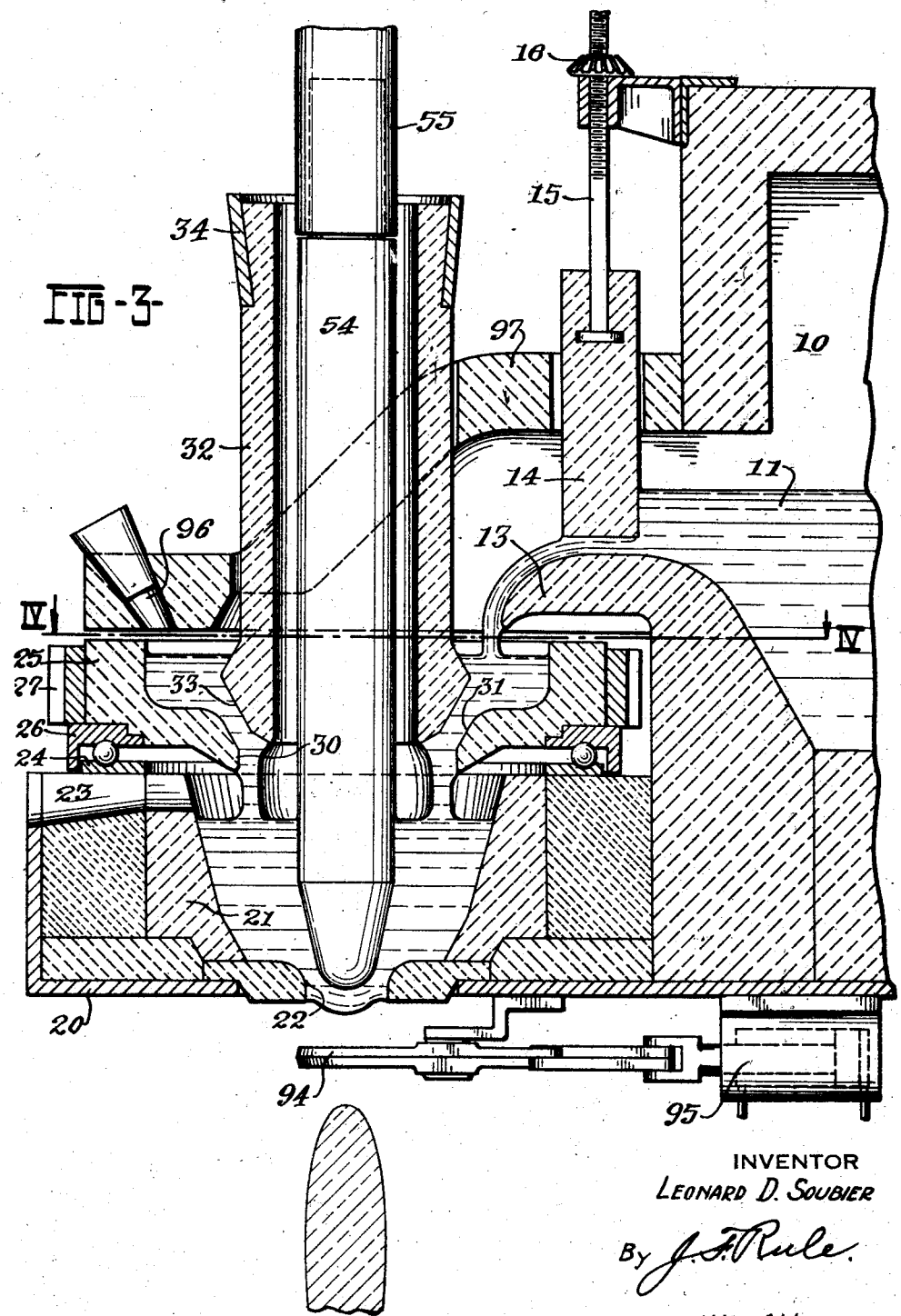

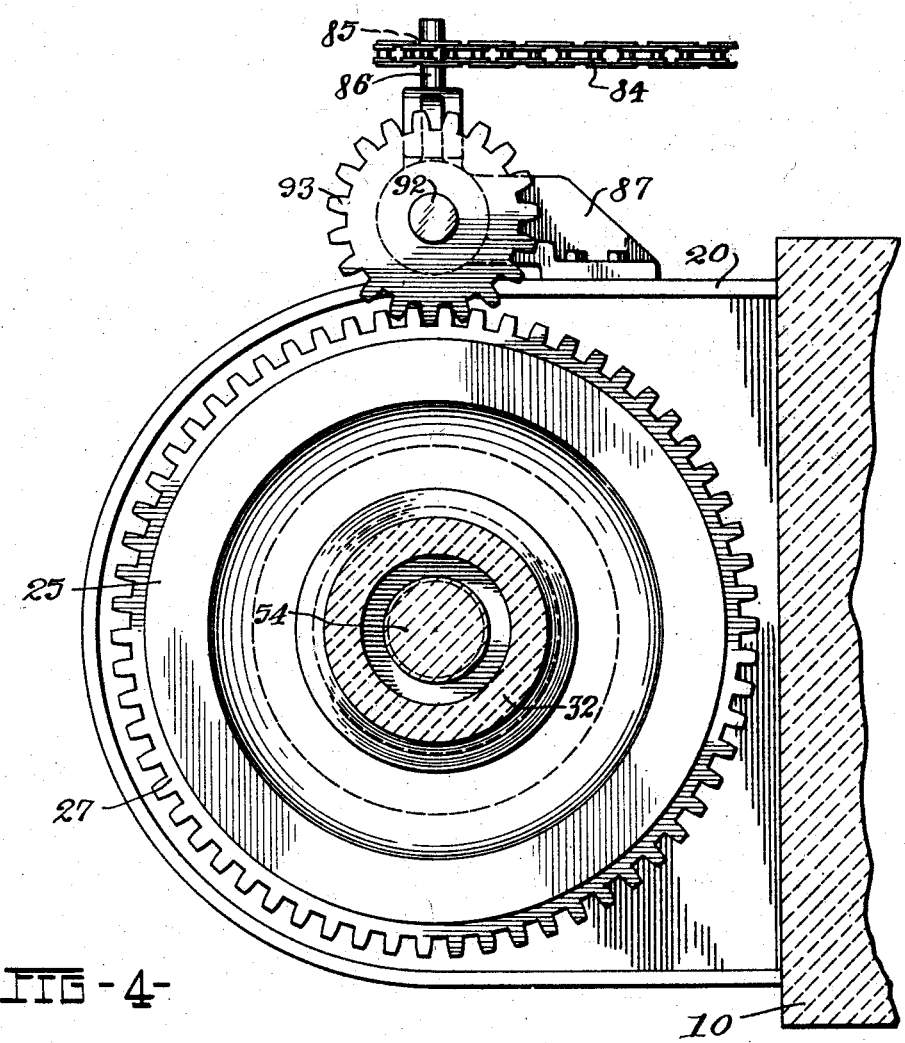

Patented May 3, 1927.

1,626,706

UNITED STATES PATENT OFFICE.

LEONARD D. SOUBIER, OF TOLEDO, OHIO, ASSIGNOR TO THE OWENS BOTTLE COMPANY, OF TOLEDO, OHIO, A CORPORATION OF OHIO.

GLASS FEEDER.

Application filed November 17, 1923. Serial No. 675,261.

My invention relates to glass feeders of the type in which a vertically reciprocating plunger automatically controls the periodic discharge of gobs or charges of molten glass from an outlet in the floor of a container. As the plunger descends, it exerts an expelling force upon the glass, thereby assisting in forcing out a compact mass or gob of glass. The suspended mass is then severed and the plunger moves upward. In feeders of this type at present in use, the glass enters the pot or container at one side of the reciprocating plunger and as there is no adequate means for circulating the glass around the plunger, there is a certain area at the side of the container opposite that at which the glass enters, which becomes chilled, due to the fact that there is no movement of the glass at that point, and the result is that a charge of glass is produced with a chilled streak therein.

An object of the present invention is to overcome this defect, and in order to accomplish this I have provided a device for distributing the molten glass around the point of discharge in such a manner that there will be no cold streaks or inequalities in the charge produced.

In the accompanying drawings:

Figure 1 is a side elevation of an apparatus constructed in accordance with my invention.

Figure 2 is a front elevation of such apparatus.

Figure 3 is a sectional elevation of the device on a larger scale.

Figure 4 is a sectional plan view taken at the line IV—IV on Figure 3, showing the construction of the distributor.

Referring to the drawings, 10 designates a furnace extension or forehearth which is continuously supplied with molten glass 11 from the furnace 12. This forehearth has formed at its outer end a lip or snout 13 over which the glass flows. Mounted above and projecting down into the glass in said snout is a control gate 14 arranged to be adjusted vertically by means of a screw 15, bevel gears 16 and an adjusting rod 17, said rod having a universal joint connection 18 with the bevel gears, and carrying at its lower end a hand wheel 19.

Mounted in a supporting bracket 20 is a stationary pot 21 having formed in the bottom thereof an outlet opening 22 through which the glass may issue, said pot arranged at a level below that of the snout 13. A peep hole 23 is formed in the side wall of said pot, allowing the operator to watch the level of the glass in said pot. Supported by the bracket 20 is a bearing 24 upon which rotates a circular distributor 25, mounted in a retainer casting 26, said casting having attached thereto a gear ring 27.

The distributor is positioned between the snout 13 and the pot 21, and has formed in the bottom thereof an opening 30, the walls 31 of which are flared, said opening being above and in alignment with the opening 22 of the pot 21. Mounted above and projecting down into the glass in said distributor is a sleeve 32, the lower end of which is enlarged and tapered at 33. The tapered walls 31 and 33 form together an annular passageway through which the glass passes to the pot 21. The sleeve 32 is mounted in a supporting bracket 34 which has sliding bearing connections 35 with uprights 36, said uprights being permanently mounted in brackets 37 extending from the forehearth 10. The sleeve is vertically adjustable, to control the flow of glass through the annular passageway, by means of cables 40 and 41 running on pulleys 42 and 43 respectively, said cables being merged into one cable 44 at 45. The cable 44 runs on a pulley 46 and has at its lower end a counterweight 47 which counterbalances the sleeve 32 and its mechanism and allows for easy adjustment. The counterweight 47 has a loose slot connection 48 with a screw 50 mounted in a bearing 51 and having a hand wheel adjustment 52. By turning the hand wheel, the sleeve is adjusted up or down. Means may also be provided to rotate the sleeve 32 in unison with the rotating distributor 25.

Extending downward through the sleeve 32 into the glass in the pot 21 is a vertically reciprocating plunger or plug 54 mounted in a holder 55. A stem projection 56 of the holder is mounted for reciprocation in a bearing 57 of a stationary bracket 58 mounted upon the uprights 36. Attached to the upper end of the stem 56 is a pivot block 60 pivoted in a yoke 61 formed on a gear casing 62. Mounted in the gear casing is a gear wheel 63 running in mesh with a pinion 64. The shaft 65 of the pinion has a universal joint connection 66 with an adjusting rod 67, on the lower end of which is a hand wheel 68. Projecting upward from the gear wheel 63 is a screw threaded stem 70 having a screw connection with a pivot block 71. The pivot block is pivotally connected with a yoke arm 72, said arm pivoted at 73 in a bracket 74 and carrying at its inner end a cam roll 75.

Mounted in bearing brackets 76 is a cam shaft 77 carrying a control cam 78 and a sprocket wheel 79 having a chain driving connection 80 with a sprocket 81 on the main drive shaft 82. A sprocket 83 on the shaft 82 has a driving connection 84 with a sprocket 85 on a shaft 86, said shaft mounted in a bearing bracket 87 attached to the support casting 20. A bevel gear 90 on the shaft 86 runs in mesh with a bevel gear 91 on the lower end of a vertical shaft 92. Attached to the upper end of said shaft is a pinion 93 which runs in mesh with the gear ring 27 of the distributor 25, thereby rotating said distributor continuously. Shears 94 are provided for shearing the glass and may be operated by a suitable air cylinder 95 or any other means known in the art. A peep hole 96 (Fig. 3) may be provided in the enclosing cover 97 for the convenience of the operator.

In operation, power may be supplied from any suitable source to the main drive shaft 82, and transmitted therefrom through the connections shown to continuously rotate the cam shaft 77 and pinion 93. The rotation of the cam shaft 77 operates through the cam 78 to periodically reciprocate the plug 54, and the pinion 93 rotates the distributor 25 continuously. With these parts in motion, the operator will raise or adjust the sleeve 32 to a suitable height and then the gate 14 is raised, allowing the glass to flow over the snout 13 into said distributor. Due to the fact that the wall 33 of the plug and walls 31 of the outlet 30 form an annular passageway, the glass will flow from the distributor into the pot 21 in the form of a cylinder, thereby being distributed uniformly and in equal quantity around the plunger, resulting in equal temperature and uniform conditions in all portions of the stationary pot. As the glass flowing from the distributor through the annular passageway is given a rotative movement about the axis of the plug 54 due to the rotation of the distributor, there will be a tendency for the glass in said pot to move in the same direction as the rotating distributor 25, thereby providing a circulation of the glass in the stationary pot.

The reciprocation of the plug 54 controls the discharge of glass through the outlet 22 of the pot, the up stroke retracting the cut stub end and the down stroke forcing out a charge of glass. With the device, as shown, a predetermined level may be maintained in either of the two receptacles, the gate 14 controlling the flow of glass to the distributor and the sleeve 32 controlling the flow to the pot 21.

From the foregoing description, it will be apparent that the glass is brought to the point of discharge in such a manner that a perfect balance of temperature conditions will prevail, thereby eliminating the usual causes of cold streaks in the charges produced.

Modifications may be resorted to within the spirit and scope of my invention.

What I claim is:

1. In a glass feeding device, the combination of a container for molten glass, having an outlet opening in the bottom thereof, a vertically reciprocating plunger in alignment with said opening, means to provide a flowing stream of glass, an auxiliary container, having an outlet opening, above and in alignment with said first mentioned container, and means to rotate said auxiliary container.

2. In a glass feeding device, the combination of a container for molten glass, having an outlet opening in the bottom thereof, a vertically reciprocating plunger in alignment with said opening, means providing a flowing stream of glass an auxiliary container having an outlet opening above and in alignment with said first mentioned container, and means forming with the outlet opening of the auxiliary container an annular passageway through which the glass issues to said first mentioned container.

3. In a glass feeding device, the combination of a container for molten glass, having an outlet opening in the bottom thereof, a vertically reciprocating plunger in alignment with said opening, means providing a flowing stream of glass an auxiliary container having an outlet opening, above and in alignment with said first mentioned container, means forming with the outlet opening of the auxiliary container an annular passageway through which the glass issues to said first mentioned container, and means to vary the effective area of said annular passageway.

4. In a glass feeding device, the combination of a container for molten glass, having an outlet opening in the bottom thereof, a vertically reciprocating plunger in alignment with said opening, means to provide a flowing stream of glass, and means intermediate said container and said stream for distributing the glass to said container and causing a rotary movement of the glass in said container.

5. The method of producing charges of molten glass which consists in supplying molten glass from a supply body to an auxiliary supply body, imparting a rotary movement to said auxiliary supply body, causing the glass to issue in cylindrical form from said last mentioned body to a discharging body of glass, causing a rotary movement to be imparted to the said discharging body and then discharging charges of glass from said discharging body of glass.

6. Mechanism for supplying charges of molten glass, comprising the combination of a container for molten glass having an outlet opening in the bottom thereof, a distributor arranged over the glass in said container, means to supply molten glass to the distributor, and means to rotate the distributor about the axis of the outlet and thereby distribute the glass before it reaches the level of the glass in the container.

7. Mechanism for supplying charges of molten glass, comprising the combination of a container for molten glass having an outlet opening in the bottom thereof, a distributor arranged over the glass in the container, means to supply a stream of glass to the distributor, and means cooperating with the distributor for distributing the glass around the axis of said opening before it reaches the level of the glass in the container and then discharging the glass downward into the container.

8. The combination of a container for molten glass having an outlet opening in its bottom, means for supplying a stream of molten glass above the container, and means interposed between said stream and container for distributing the glass around the axis of the outlet while above the level of the glass in the container and causing a symmetrical downward discharge of the distributed glass into the container around the axis of said outlet.

9. The combination of a container for molten glass having an outlet opening in its bottom, means for supplying a stream of glass above the container and at one side of the outlet, and a rotating distributing device operable to distribute the glass and cause it to enter the container in the form of an annular body of glass surrounding the vertical axis of the outlet.

10. The combination of a container for molten glass having an outlet opening in its bottom, means for supplying a stream of glass above the container and at one side of the outlet, and means for distributing the glass and causing it to enter the container in the form of a vertically descending annular body of glass concentric with said outlet.

11. The combination of a container for molten glass having an outlet opening in its bottom, means for supplying a stream of glass above the container and at one side of the outlet, a distributor arranged above the container to receive the stream of glass, and means to rotate the distributor about the axis of said outlet and impart a rotative movement to the glass entering the container.

12. The combination of a container for molten glass having an outlet opening in its bottom, means providing a downwardly directed annular passageway above the glass in the container, and surrounding the vertical axes of the outlet, and means to cause the discharge of molten glass through said passageway into the container.

13. The combination of a container for molten glass having an outlet opening in its bottom, means providing a downwardly directed annular passageway above the glass in the container and surrounding the vertical axis of the outlet, means to cause the discharge of molten glass through said passageway into the container, and means to adjust the size of said passageway and thereby regulate the rate of flow into the container.

14. The combination of a container for molten glass having an outlet opening in its bottom, means providing an annular passageway above the glass in the container, means to cause the discharge of molten glass through said passageway into the container, and a plunger positioned over the outlet and projecting downwardly into the glass in the container, said passageway being arranged to surround the plunger.

15. The combination of a container for molten glass having an outlet opening in its bottom, a vertically reciprocating plunger regulator projecting downward into the glass over said opening, a sleeve surrounding said plunger, an auxiliary container having an opening in its bottom forming with said sleeve an annular passageway surrounding the plunger, and means for supplying molten glass to said auxiliary container.

16. The combination of a container for molten glass having an outlet opening in its bottom, a vertically reciprocating plunger regulator projecting downward into the glass over said opening, a sleeve surrounding said plunger, an auxiliary container having an opening in its bottom forming with said sleeve an annular passageway surrounding the plunger, means for supplying molten glass to said auxiliary container, and means for effecting a relative vertical adjustment of said sleeve and auxiliary container, the opposite walls of the sleeve and container being so shaped that said adjustment causes an adjustment of the size of said annular passageway.

17. The method which consists in maintaining a downward flow of a stream or body of molten glass annular in cross-section, confining the glass to produce a head of accumulated glass, and causing the glass to issue from an outlet beneath said head and within the outline of the vertical downward projection of said body.

18. The method which consists in maintaining a cylindrical downward flow of molten glass, confining the glass to produce a head of accumulated glass, causing the glass to issue from an outlet beneath said head and concentric with said flow, and causing a circulation of the glass about the axis of said outlet before it issues from the outlet.

19. The method which consists in maintaining a cylindrical downward flow of molten glass, imparting to the flowing glass a rotative movement about a vertical axis, and accumulating the glass while in a molten condition to form a supply body.

20. The method which consists in producing a continuous spiral downward movement of glass in the form of a tubular body of glass, accumulating the glass beneath its path of spiral movement while in a molten condition to form a supply body and flowing the accumulated glass through an outlet below the body of accumulated glass.

21. The method which consists in producing a continuous spiral downward movement of glass in the form of a tubular body of glass, confining the glass and thereby accumulating a head of glass over a discharge outlet concentric with the axis of said spiral movement, and causing a periodically regulated discharge of glass through the outlet.

22. In a glass feeding device, the combination of a container for molten glass, having an outlet opening in the bottom thereof, a vertically reciprocating plunger in alignment with said opening, means to provide a flowing stream of glass, and rotary distributing means intermediate said container and said stream operable to distribute the glass around the plunger and then discharge the glass into said container.

Signed at Toledo, in the county of Lucas and State of Ohio, this 15th day of November, 1923.

LEONARD D. SOUBIER.